United States Patent
Huang

(10) Patent No.: US 9,334,708 B2
(45) Date of Patent: May 10, 2016

(54) FLOW CONTROL DEVICE, METHOD AND PRODUCTION ADJUSTMENT ARRANGEMENT

(75) Inventor: Tianping Huang, Al Khobar (SA)

(73) Assignee: BAKER HUGHES INCORPORATED, Houston, TX (US)

( * ) Notice: Subject to any disclaimer, the term of this patent is extended or adjusted under 35 U.S.C. 154(b) by 751 days.

(21) Appl. No.: 13/453,563

(22) Filed: Apr. 23, 2012

(65) Prior Publication Data

US 2013/0277058 A1 Oct. 24, 2013

(51) Int. Cl.
*E21B 34/08* (2006.01)
*E21B 43/12* (2006.01)
*E21B 41/00* (2006.01)

(52) U.S. Cl.
CPC ............. *E21B 34/08* (2013.01); *E21B 41/0085* (2013.01); *E21B 43/12* (2013.01); *Y10T 137/0324* (2015.04); *Y10T 137/8593* (2015.04)

(58) Field of Classification Search
CPC ......... E21B 43/12; E21B 34/06; E21B 34/08; E21B 34/066
USPC .......................................... 166/316, 386, 373
See application file for complete search history.

(56) References Cited

U.S. PATENT DOCUMENTS

| 4,724,434 | A | 2/1988 | Hanson et al. |
|---|---|---|---|
| 5,482,117 | A | 1/1996 | Kolpak et al. |
| 6,691,782 | B2 | 2/2004 | Vandevier |
| 7,891,430 | B2 * | 2/2011 | Willauer ........................ 166/373 |
| 7,942,206 | B2 | 5/2011 | Huang et al. |
| 2009/0101329 | A1 * | 4/2009 | Clem et al. .................... 166/66.6 |
| 2010/0038086 | A1 | 2/2010 | Bunnell et al. |
| 2011/0005752 | A1 | 1/2011 | Huang et al. |
| 2012/0015852 | A1 | 1/2012 | Quintero et al. |
| 2012/0048620 | A1 | 3/2012 | Hopwood et al. |

OTHER PUBLICATIONS

Notification of Transmittal of the International Search Report and the Written Opinion of the International Searching Authority, or the Declaration; PCT/US2013/033514; Jul. 2, 2013.
T.S. Ramakrishnan, "On Reservoir Fluid-ow Control with Smart Completions"; Society of Petroleum Engineers, SPE International, SPE Paper No. 84219, Oct. 5, 2003, 12 pages.

* cited by examiner

*Primary Examiner* — Kenneth L Thompson
*Assistant Examiner* — Wei Wang
(74) *Attorney, Agent, or Firm* — Cantor Colburn LLP

(57) ABSTRACT

A flow control device includes, a body defining at least a portion of a flow passageway, at least one movable member in operable communication with the body, movable between at least a first position that provides a first restriction to flow through the flow passageway and a second position that provides a second restriction to flow through the flow passageway, and a circuit in operable communication with the at least one movable member that is configured to sense conductivity of fluid flowing through the flow passageway and to promote movement of the at least one movable member to move from the first position to the second position in response to a change in conductivity of fluid flowing through the flow passageway.

12 Claims, 3 Drawing Sheets

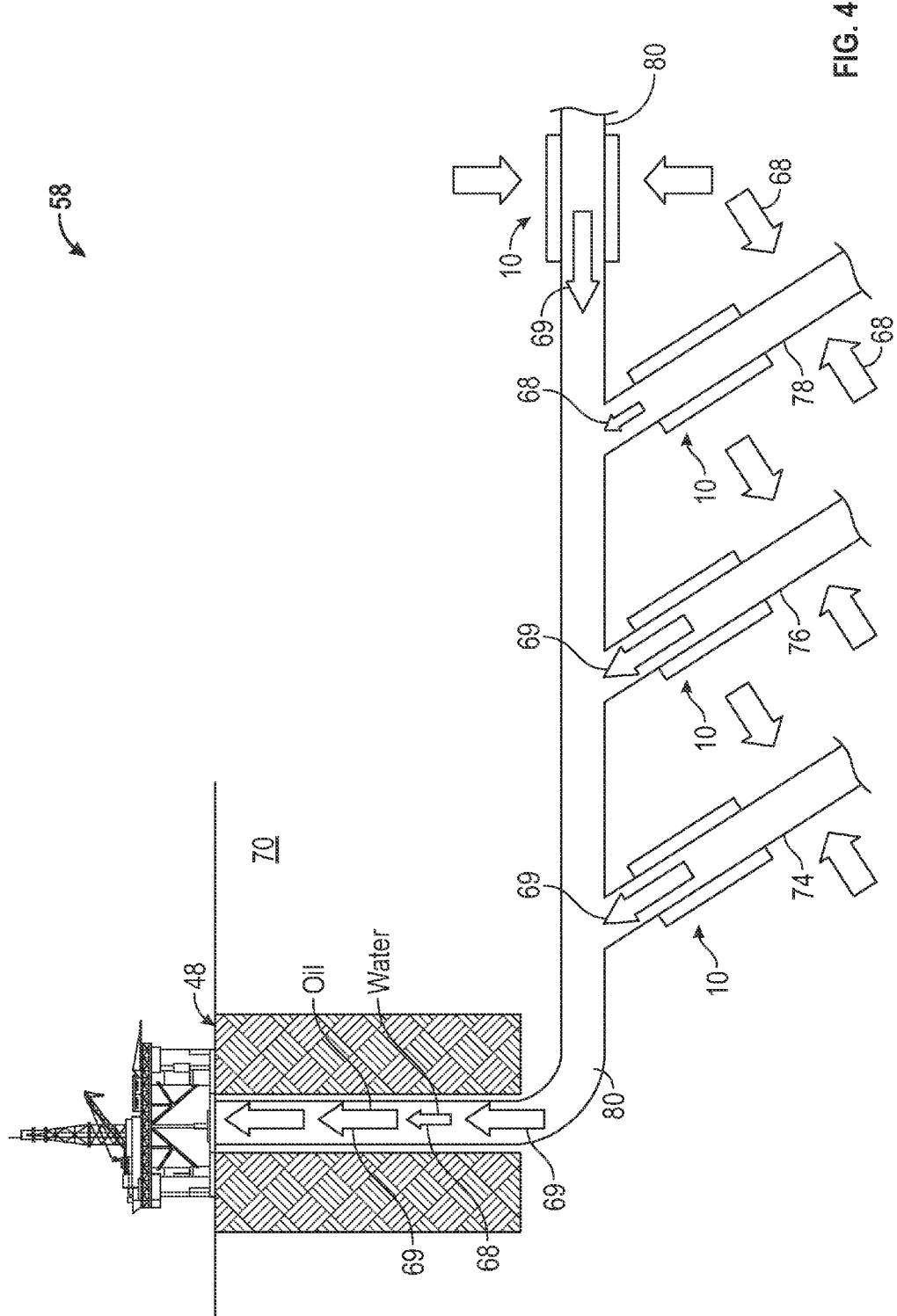

FLOW CONTROL DEVICE, METHOD AND PRODUCTION ADJUSTMENT ARRANGEMENT

BACKGROUND

It is sometimes desirable in systems that transport fluids to adjust the flow rate of some fluids transported therethrough while allowing the flow rates of other fluids to remain unchanged. Examples of such fluid transport systems include carbon dioxide sequestration, water wells and hydrocarbon recovery, however, the invention disclosed herein is not limited to just these examples. In any fluid transport system the proportions of different fluids being transported is subject to change over time, such that the proportion of some fluids that are undesirable to transport increases. Typical systems require that the undesirable fluid be separated from the desirable fluids at a later time. Separating the undesired fluids after having transported them is usually less efficient that preventing their transport in the first place. Systems and methods that provide greater control of flow rates of different fluids earlier in the process are well received in fluid transporting industries.

BRIEF DESCRIPTION

Disclosed herein is a flow control device. The device includes, a body defining at least a portion of a flow passageway, at least one movable member in operable communication with the body, movable between at least a first position that provides a first restriction to flow through the flow passageway and a second position that provides a second restriction to flow through the flow passageway, and a circuit in operable communication with the at least one movable member that is configured to sense conductivity of fluid flowing through the flow passageway and to promote movement of the at least one movable member to move from the first position to the second position in response to a change in conductivity of fluid flowing through the flow passageway.

Further disclosed herein is a flow control device comprising a variable flow area passageway, the flow control device is configured to alter area of the variable flow area passageway in response to a change in conductivity of fluid flowing therethrough.

Further disclosed herein is a method of controlling fluid flow rates. The method includes, maintaining a flow passageway at a fully open position in response to conductivity of fluid flowing through the flow passageway having a first conductivity, and adjusting the flow passageway to be more restrictive than the fully open position in response to changes in conductivity of fluid flowing through the flow passageway.

Further disclosed herein is a production adjustment arrangement for a well. The production adjustment arrangement includes, a plurality of flow control devices distributed along the well that are configured to restrict flow therethrough in response to an increase in conductivity of fluid flowing therethrough.

BRIEF DESCRIPTION OF THE DRAWINGS

The following descriptions should not be considered limiting in any way. With reference to the accompanying drawings, like elements are numbered alike:

FIG. 4 depicts a schematic side view of an alternate well that employs a plurality of the flow control devices of FIG. 1.

DETAILED DESCRIPTION

A detailed description of one or more embodiments of the disclosed apparatus and method are presented herein by way of exemplification and not limitation with reference to the Figures.

Figure 1:
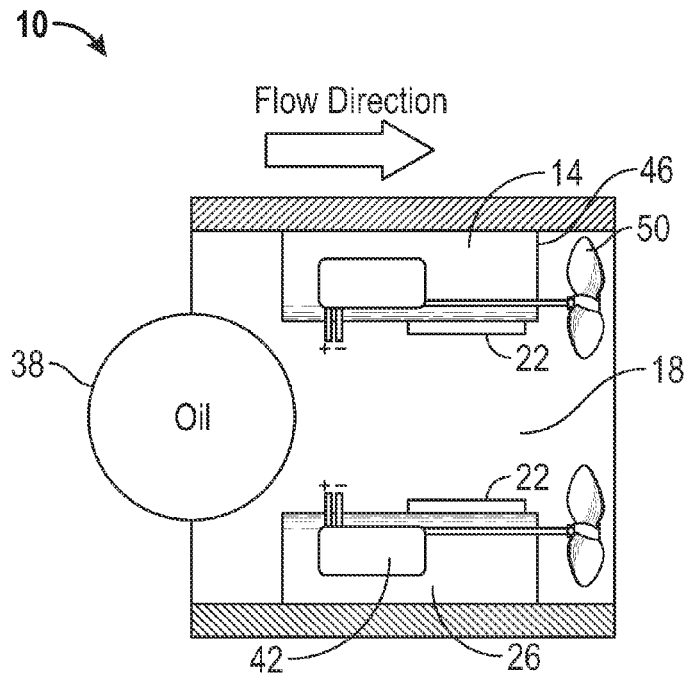
FIG. 1 depicts a partial cross sectional view of a flow control device disclosed herein.
Figure 2:
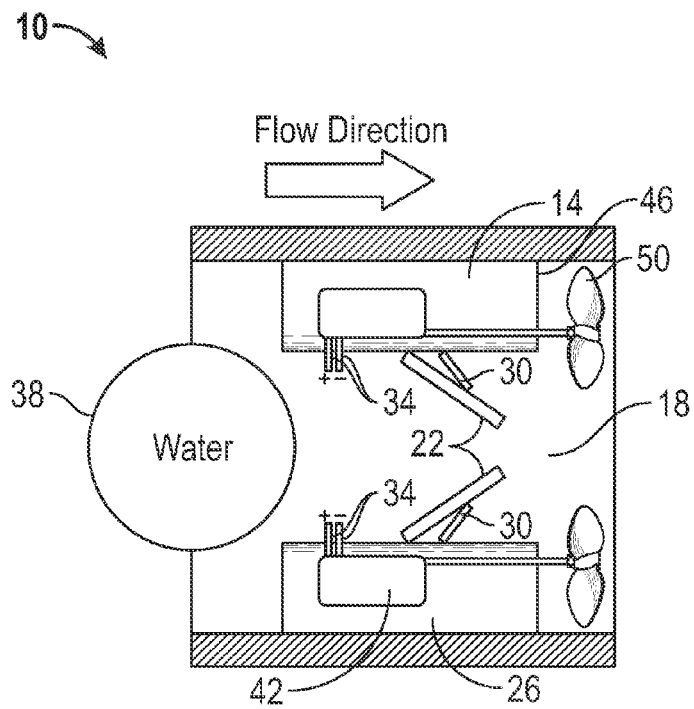
FIG. 2 depicts a partial cross sectional view of the flow control device of FIG. 1.

Referring to FIGS. 1 and 2, an embodiment of a flow control device disclosed herein is illustrated at 10. The flow control device 10 includes a body 14 that defines a flow passageway 18 and movable members 22, shown in this embodiment as fins that move at least between a fully open position as shown in FIG. 1 and a restricted position as shown in FIG. 2. A flow area of the flow passageway being less when in the restricted position. A circuit 26 is in operable communication with the movable members 22 and includes elements 30, such as an electric motor, for example that are able to move the movable members 22 from the first position to the second position. At least two conductors 34 are also part of the circuit 26 and are positioned such that at least a portion of each conductor 34 is exposed to the flow passageway 18 such that the conductors 34 are exposed and are contacted by fluid 38 flowing through the flow passageway 18. The conductors 34 enable the circuit 26 to sense electrical conductivity of the fluid 38. The circuit 26 is further configured to respond to changes in conductivity of the fluid 38 by moving the movable members 22. In this embodiment the movable members 22 are moved from the less restrictive position to the more restrictive position in response to an increase in conductivity of the fluid 38.

In this embodiment the circuit 26 is configured such that electrical current is flowable from one of the conductors 34 through the fluid 38 to the other of the conductors 34. As such, the fluid 38 serves directly as part of the circuit 26 and consequently conductivity of the fluid 38 affects the flow of electrical current through the circuit 26. The flow control device 10 of this embodiment is configured to extend the movable members 22 to a more restrictive position in response to an increase in current flowing through the circuit 26. This is done by directly supplying the current that flows through the fluid 38 to the motor(s) 30 that when electrically energized move the movable members 22 toward the restrictive position. The device 10 is further configured to be reversible such that as conductivity of the fluid 38 drops, so does the current in the circuit 26 and the movable members 22 are automatically moved back to their less restrictive positions.

The control device 10 disclosed in these figures include optional batteries 42 and generators 46 that supply power to the circuit 26. The generators 46 in this embodiment employ turbines 50 that rotate in response to the fluid 38 flowing thereby. The electrical power generated is supplied to the batteries 42 to maintain charge thereof, thereby negating the need for power to be provided from remote locations. However, alternate embodiments are contemplated, although not shown, that include conductors that provide power to the circuit 26 from a remote location such as surface 48, for example. Such remotely supplied power can come from the grid or from solar, wind or other power generating systems. For systems with remote power supply, the batteries 42 may or may not be utilized.

Other embodiments of the device 10 could employ latching devices, not shown, that hold the movable members 22 in a position once moved, such as in the more restrictive position, without electrical power having to be continuously supplied to the elements 30. Such an embodiment could intentionally be non-reversible and could find use in applications where it is thought that once a higher conductivity fluid 38 causes the movable members 22 to move such fluid 38 will continue to flow thereby negating the need to allow the movable members 22 to return to a less restrictive position.

The flow control device 10 described above can be employed in tubular applications, for example, to automatically adjust flow resistance through the device 10 depending upon the conductivity of the fluid 38. One application where the disclosed device 10 may be employed is in the hydrocarbon recovery industry. In this industry, undesirable water is commonly recovered along with desirable hydrocarbon fluids. The device 10 when employed in a hydrocarbon recovery well can automatically decrease the production of water in response to increases in the proportion of hydrocarbon being produced.

Figure 3:
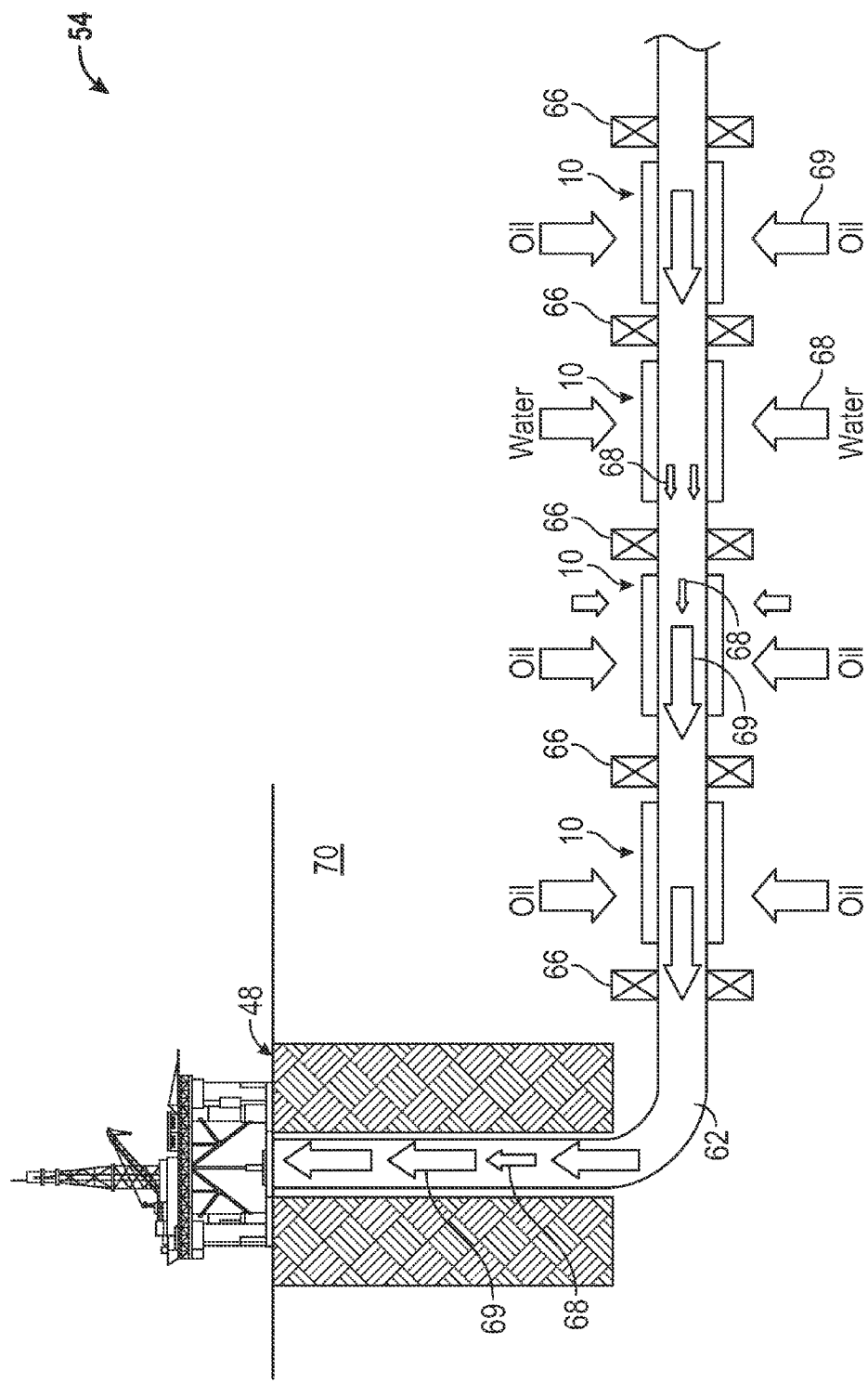
FIG. 3 depicts a schematic side view of a well that employs a plurality of the flow control devices of FIG. 1.

Referring to FIGS. 3 and 4, wells 54 and 58 respectively, are illustrated each of which employs a plurality of the flow control devices 10 disclosed herein. The well 54 has four groups of the devices 10 distributed along a single wellbore 62 separated by packers 66. The illustration represents differences in flow rates at each location by the relative size of the arrows, with the arrows representing the flow of water 68 having a different shading darkness than arrows that represent the flow of hydrocarbons 69. In this example, the flows from the earth formation 70 into the wellbore 54 between each set of adjacent packers 66 are approximately equal whether the flows are of water 68 or hydrocarbons 69. However flow through each of the groups of the flow control devices 10 distributed along the wellbore 54 differ depending upon whether the flow therethrough is primarily water 68 or primarily hydrocarbon 69, the hydrocarbon 69 being oil in this case. Since water 68 has greater conductivity than oil and other hydrocarbons 69, the groups of the flow control devices 10 passing water 68 therethrough automatically adjust to a more restrictive position as detailed above thereby decreasing flow rates therethrough. The groups of the flow control devices 10 are placed outside of the wellbore 62 and connected to the formation 70 to control fluid flowing into the wellbore 62. Each section of the wellbore 62 is isolated by a pair of the packers 66 and includes a group of the flow control devices 10 (smaller tube size) that are placed outside of the wellbore 62. The flow direction of the devices 10 are shown in the illustration of FIG. 3 as being perpendicular to that of the wellbore 62.

The well 58 employs four of the devices 10. Unlike the well 54, however, the well 58 has each of the devices 10 positioned inside of the tubulars of separate legs 74, 76, 78 and 80 of the multilateral well 58. In this embodiment the device 10 in the leg 78 is more restrictive than the devices 10 in the other legs 74, 76 and 80 due to the high concentration of water 68 sensed thereby. Thus the flow of water 68 from the leg 78 is less than the flow of oil 69 through each of the legs 74, 76 and 80. This automatic reduction in the production of water 68 decreases the amount of water 68 that needs to be separated from hydrocarbons 69 later in the process thereby lowering operating costs and improving overall efficiency of the well 58.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A flow control device comprising:
   a body defining at least a portion of a flow passageway;
   at least one movable member in operable communication with the body, movable between at least a first position that provides a first restriction to flow through the flow passageway and a second position that provides a second restriction to flow through the flow passageway;
   a circuit in operable communication with the at least one movable member and in operable communication with a fluid flowing through the flow passageway, the circuit being configured such that electrical current is flowable from one conductor to another conductor of the circuit through the fluid in the flow passageway such that increases in conductivity of the fluid allows electrical current to flow directly through the fluid and the same electrical current is flowable through an element to cause movement of the at least one movable member from the first position to the second position; and
   one or more batteries in operable communication with the circuit, the one or more batteries supplying the electrical current to the circuit flowing directly through the fluid.

2. The flow control device of claim 1, wherein the body is a tubular and the flow passageway passes through a central portion of the tubular.

3. The flow control device of claim 1, wherein the circuit includes at least two conductors in operable communication with the body being configured and positioned to make contact with the fluid that flows through the flow passageway.

4. The flow control device of claim 3, wherein the electrical current that flows through the fluid is provided by the flow control device.

5. The flow control device of claim 1, wherein the conductivity is electrical conductivity.

6. The flow control device of claim 1, wherein the element is a motor.

7. The flow control device of claim 1, wherein the circuit is configured to sense changes in the conductivity due to changes in proportions of water relative to hydrocarbons in the fluid.

8. The flow control device of claim 1, further comprising an electrical generator having a turbine that rotates in response to the fluid flowing thereby that recharges the one or more batteries.

9. The flow control device of claim 1, wherein the second restriction is more restrictive to flow through the flow passageway than the first restriction.

10. The flow control device according to claim 1, wherein the one or more batteries are arranged downhole.

11. A method of controlling fluid flow rates, comprising:
maintaining a flow passageway at a first level of restriction in response to conductivity of the fluid flowing through the flow passageway having a first conductivity;
increasing current flowing from one or more batteries directly through the fluid from one conductor of a circuit to another conductor of the circuit in response to an increase in conductivity of the fluid;
flowing the same current that flows through the fluid through an element; and
adjusting the flow passageway to a second level of restriction with actuation of the element.

12. The method of claim 11, wherein increasing current flowing from the one or more batteries includes increasing current flowing from one or more batteries arranged downhole.

* * * * *